United States Patent Office 3,125,405
Patented Mar. 17, 1964

3,125,405
METHOD OF CREASE-PROOFING CELLULOSIC
FABRICS AND PRODUCTS THEREOF
John L. Gardon, Levittown, Pa., assignor to Rohm & Haas
Company, Philadelphia, Pa., a corporation of Delaware
No Drawing. Filed June 9, 1959, Ser. No. 819,009
14 Claims. (Cl. 8—116.3)

The present invention concerns the crease-proofing of cellulose fabrics, especially of cotton and rayon.

It has heretofore been suggested (Strain United States Patent 2,173,005) to prepare a polymer of an unsaturated amide, such as polymethacrylamide, to convert this polymer into the N-methylol derivative by means of formaldehyde and to impregnate a cellulosic fabric with an aqueous solution of such methylolated polymer. The impregnated fabric was then heated in the presence of an acidic catalyst for the purpose of reacting the polymer with the cellulose to cross-link the latter and impart resistance to creasing and wrinkling. This reaction, however, has an extremely superficial effect and is incapable of increasing the resistance to creasing to any practical extent. Any modification involving the impregnation of the fabric with a polymeric amide, methylolating in situ, and subsequently reacting under acid conditions gives similar results. A polymer cannot penetrate the fabric, and surface treatment thereby has little or no effect on the resilience.

It has also been suggested (Example II of Strain United States Patent 2,173,005) to impregnate a cellulosic fabric with a methylolated monomer such as N-methylol-methacrylamide and then react the monomer with the cellulose in the presence of an acid such as tartaric acid. It has been found that this reaction results in the production of a compound having the Formula I:

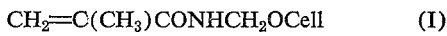

$$CH_2=C(CH_3)CONHCH_2OCell \qquad (I)$$

wherein Cell represents the radical of the cellulose molecule. This product is not the cause of the increase in the resistance to creasing. Instead, the improvement in crease-resistance is obtained simply by virtue of the fact that the N-methylol monomer acts as a source of formaldehyde since under normal conditions, the N-methylol monomer is 20% dissociated and the reaction of the formaldehyde with the cellulose provides the cross-linking that imparts crease-resistance. The resulting product is capable of attaining a maximum of 120° in crease-recovery angle and is associated with the typical brittleness resulting from the short cross-links obtained from formaldehyde. That it is the cross-linking by reaction of the cellulose with formaldehyde which causes the improved crease-resistance is borne out by the fact that essentially the same results are obtained if the N-methylol-methacrylamide is replaced with N-methylol-propionamide which contains no point of ethylenic unsaturation.

The impregnation of the cellulose fabric with the N-methylol-acrylamide and an acid followed by heating to form an ether of the formula

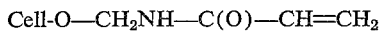

$$Cell-O-CH_2NH-C(O)-CH=CH_2$$

(Cell being the radical of cellulose) as in Example II of Mantell 2,837,512 and the subsequent reaction of the ether thus formed under alkaline conditions such as are obtained by using potassium hydroxide (as in Mantell United States Patent 2,837,511) serves to increase the crease-recovery angle considerably by virtue of the formation of a cross-linked cellulose of the Formula II:

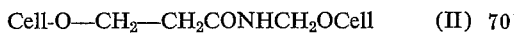

$$Cell-O-CH_2-CH_2CONHCH_2OCell \qquad (II)$$

However, the product thereby obtained undergoes excessive loss in strength when subjected to chlorine during bleaching followed by heating as in drying and ironing.

In accordance with the present invention, it has been found that cellulosic fabrics can be improved in crease-resistance to an even greater extent than can be attained by any of the procedures mentioned hereinabove without being subject to the excessive chlorine damage to which the fabrics obtained by the last of the several processes described hereinabove are subject. By the process of the present invention, the cellulose material, in the form of fibers, filaments, woven or knitted fabrics or carded webs, or other fabricated structures, is impregnated with an N-methylol-acrylamide and then the treated fabric is subjected to conditions under which the acrylamide derivative is polymerized by vinyl addition (that is, at the double bond) and also reacted with hydroxyl groups in the cellulose molecule. This may be accomplished by including within the impregnating solution used to apply the N-methylol-acrylamide, or by applying to the fabric before or after such impregnation, a free-radical initiator for the addition polymerization of the monomer which is of acidic character or, if not acidic, the initiator is accompanied by an acid. In this manner, the amide monomer penetrates the cellulose material and polymerizes to provide a long-chain molecule which at numerous positions becomes attached to the cellulosic molecules by means of ether linkages resulting from the reaction of the methylol groups in the amide polymer with the hydroxyl groups of the cellulose. Alternatively, the monomer may be polymerized by vinyl addition, using a free-radical initiator before or after reaction is effected with the cellulose through the methylol groups. However, the simultaneous or one-step operation is preferred and is generally more efficient for a given amount of reagents, especially the N-methylol-acrylamide.

By the procedure of the present invention, cellulose materials can have their resistance to creasing so greatly enhanced that crease-recovery angles as high as 145° or more are readily obtained. In addition, the loss in tensile strength as the result of chlorination followed by drying and ironing is markedly reduced as compared to that obtained when the monomeric N-methylol-acrylamide is merely reacted with the cellulose molecule by means of an alkaline catalyst giving the product of Formula II hereinabove.

The free-radical initiator employed is soluble in water or in a single-phase solution containing at least 20% water, such as mixtures of water with an alcohol, e.g., methanol or ethanol, or with a ketone, such as acetone. The initiator is preferably of water-soluble character so that it can readily effect polymerization in a completely aqueous medium. Preferred examples include ammonium persulfate and the alkali metal persulfates. These catalysts also are acid in character so that they serve to polymerize the monomer and also to react the methylol groups with the hydroxyls of the cellulose. The use of these catalysts or initiators is accordingly quite advantageous since they do not require the inclusion of additional acid though, if desired, small amounts of additional acid may be included in order to effect simultaneous vinyl polymerization and etherification reactions.

A modification may involve the use of a neutral initiator such as azodiisobutyronitrile which, because of its water-insolubility, requires application by way of an organic solvent which is miscible with water. The use of this type of initiator is preferably followed by the application of the acid catalyst so that in effect, the monomer is first polymerized in situ within the cellulosic material and then when the acidic material, such as ammonium chloride, is added the methylol groups are reacted with the hydroxyl groups of the cellulose.

Examples of acidic catalysts that may be employed include sodium bisulfate, ammonium chloride, the salts of mineral acids such as hydrochloric and sulfuric acid with amines such as 2-methyl-2-aminopropanol-1, para-toluenesulfonic acid, oxalic acid, lactic acid, acetic acid, and the like.

After impregnation with the initiator with or without the additional acidic catalyst, the fabric may be dried and then heated at 105° to 205° C. to effect simultaneously polymerization and crosslinking. In the two-stage procedure, a wet phase polymerization may be effected by merely suspending the fabric in the aqueous solution of the N-methylol-acrylamide and the initiator, which solution is held at 25° to 100° C. until the polymerization is effected. Thereafter, the material is treated with an acidic catalyst and then dried and heated at 105° to 205° C. until the predetermined amount of cross-linking is obtained. Conversely, the fabric may be impregnated with the N-methylol-acrylamide and acidic catalyst but without the polymerization initiator, the impregnated fabric being thereafter dried and cured at 105° to 205° C. to react the N-methylol-acrylamide with the cellulose. Finally, the fabric is impregnated with a polymerization initiator or maintained in a solution thereof and polymerization is effected in either an essentially dry phase system at 105° to 205° C. or in a wet phase system at 25° to 110° C. respectively.

The N-methylol-acrylamide may be applied in aqueous solutions at concentrations of 5 to 25% or more with wet pick-up controlled to provide an increase in weight of the fabric ranging from about 5 to 16% or more. The optimum proportion is generally from about 8 to 12% increase in weight of the fabric. The proportion of initiator which may be employed ranges from 5 to 10% by weight, based on the weight of total monomer (including any other monomer intended to be copolymerized in situ with the acrylamide monomer). When the initiator is supplemented with an acid or acidic material, the amount thereof may range from 0.1% to 3% by weight, preferably 0.5% to 2%, based on the weight of total solution and the amount of acidic catalyst may be about 0.05% to 1% by weight of the solution.

In general, the N-methylol-acrylamide serves quite well when the cellulose material is impregnated with it as the only polymerizable material so that in effect, homopolymers thereof serve to cross-link the cellulose molecules. However, the properties of the product can be modified by including one or more additional monomers which do not react with the cellulose so that in effect, a copolymer of the N-methylol-acrylamide reacts with the cellulose. Examples of comonomers (which must have appreciable solubility in water or in a single-phase aqueous medium containing 20% water as mentioned above in connection with the initiator) that can be employed include acrylonitrile, acrylic acid, acrylamide itself, vinyl pyrrolidinone, vinyl acetate, and esters of acrylic acid or methacrylic acid with alcohols having from 1 to 8 or more carbon atoms. Examples of such esters include methyl acrylate, ethyl acrylate, butyl acrylate, 2-ethylhexyl acrylate, butyl methacrylate, and 2-ethylhexyl methacrylate. Some monomers which have low water-solubility but which are soluble in another comonomer, such as 1-vinyl-2-pyrrolidinone, can be dissolved in the latter comonomer and then added to the aqueous medium by which it is to be applied to the fabric. The relative proportions between the N-methylol-acrylamide and the other monomer or monomers may vary widely. However, it is preferred that at least 50% by weight of the monomer mixture be N-methylolacrylamide.

It is surprising that such outstanding improvement in crease-resistance can be obtained, particularly in view of the fact that the polymerization of the amide must be effected practically while exposed to the atmosphere so that oxygen, a well-known polymerization inhibitor, has free access to the acrylamide impregnated fabric. The products are wash-fast and have dry crease-recovery angles in the range of 120° to 145° or more. Even after five Sanforize washes, the dry crease-recovery is substantially unchanged. The fabric undergoes no appreciable discoloration as a result of the reaction with the methylol-acrylamide and it undergoes no discoloration as a result of chlorine-bleaching and ironing short of the scorching temperature. The hand of the products is generally quite soft, and this can be modified appreciably as desired by selection of comonomers and proportions thereof. The moisture regain, though reduced somewhat, is still adequate for comfort.

The treatment of the present invention may be applied to any textile material containing cellulosic fibers or yarns and the textile material may be in the form of woven or knitted fabrics, or "non-woven" fabrics derived from carded webs or from fibrous or filamentous webs obtained in any suitable fashion, such as air-deposition, wherein the fibers or filaments are distributed in a random array. The treatment may also be applied to yarns, threads, or other plied structures, or it may be applied to fibers or filaments in the form of loose or bulk masses or in the form of more or less compacted webbing, matting, or batting. In all fibrous structures having the fibers in heterogeneous array, the treatment renders the textile more resilient.

The fabrics or fibrous masses that may be treated are preferably those which contain a predominant proportion of cellulosic fibers and/or filaments, by which is meant that the cellulosic fibers constitute more than 50% of the total fibers by weight. It is particularly useful with textile materials of cotton, viscose rayon, cuprammonium cellulose rayon, linen, ramie, as well as textile materials comprising fibers and filaments of two or more of such cellulosic materials. At the time of treatment with the cross-linking agent of the present invention, the fabric may be in the greige state or it may have been previously bleached, dyed, and/or printed or otherwise finished.

If desired, the treatment with the N-methylol-acrylamide may be supplemented by a treatment with a hand-modifier or builder, softener, or water-repellent agents. Such modifying agents may be applied simultaneously by way of the same aqueous solution of the N-methylol-acrylamide or they may be applied to the fabric before or after the application of the N-methylol-acrylamide by a separate operation.

As water-repellent materials which also serve to soften the textile material, there may be used those quaternary ammonium compounds having a long-chain hydrocarbon group, such as stearamidomethylpyridinium chloride, stearyl pyridinum chloride, octadecyloxymethylpyridinium chloride, and the various quaternary ammonium salts described in United States Patent 2,351,581. The amount of water-repellent or softener may be as much as 5% and is preferably in the range of about 1 to 3% in the aqueous medium by which it is applied, assuming 100% wet pick-up. When it is applied solely for the purpose of softening, there may be employed as little as 0.1%.

Examples of auxiliary agents for enhancing the crease-resistance, for hand-building, for increasing tear strength, or for improving abrasion-resistance which can be applied in aqueous media include aqueous dispersions of water-insoluble linear addition polymers of one or more monoethylenically unsaturated monomeric compounds. Examples include water-insoluble copolymers of 0.5 to 8% by weight of acrylic acid, methacrylic acid, and itaconic acid. Any one or more of these monoethylenically unsaturated acids may be copolymerized with one or more other copolymerizable compounds containing a single vinylidene group, such as esters of acrylic acid or methacrylic acid and monohydric alcohols such as methyl, ethyl, butyl, octyl, dodecyl, cyclohexyl, cyanoethyl, aminoethyl, and the like; esters of itaconic acid and the above alcohols; esters from maleic, fumaric, or citraconic acids, and the above alcohols; vinyl esters of carboxylic acids such as acetic, propionic, butyric, and the like; vinyloxyalkyl esters such as vinyloxyethyl acetate, etc.; vinyl ethers such as ethyl vinyl ether, butyl vinyl ether, octyl vinyl ether, hydroxyethyl vinyl ether, aminoethyl vinyl ether, aminopropyl vinyl ether, dimethylaminoethyl vinyl ether, vinyloxyethoxyethanol, vinyloxypropoxyethanol; methacrylonitrile or acrylonitrile; acrylamide, or methacrylamide, and N-substituted amides of these types; vinyl chloride, vinyl bromide, vinylidene chloride, vinylidene fluoride, vinylidene chloride, 1-chloro-1-fluoroethylene, ethylene, styrene, 2-vinylpyridine, 4-vinylpyridine, 2-methyl-5 - vinylpyridine. These water-insoluble copolymers may be dispersed by means of non-ionic dispersing agents, such as alkylphenoxypolyethoxyethanols having alkyl groups of about seven to eighteen carbon atoms and six to sixty or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing six to sixty or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing six to sixty oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing six to sixty oxyethylene units, etc.; block copolymers of ethylene oxide and propylene oxide comprising a hydrophobic propylene oxide section combined with one or more hydrophilic ethylene oxide sections. The concentration of the water-insoluble polymer may be from ½ to 5% in the aqueous medium by which it is applied, either simultaneously with the N-methylolacrylamide or before or after the application of the N-methylol-acrylamide. These auxiliary agents may be used in amounts which serve to modify the hand from a soft to a firm or stiff hand depending upon what is desired and depending upon the selection of comonomers used in any copolymer thus applied.

The fabric treated in accordance with the present invention may be a dyed fabric but, if not, the pigments and/or dyes may be included in the aqueous solution used to apply the cross-linking agent or any other auxiliary treating agent. A dye or pigment may be applied by printing or dyeing the fabric after the completion of the crease-proofing treatment of the present invention.

The reaction of the N-methylol-acrylamide with the cellulose may be effected during or after drying of the impregnated fabric, as in a curing oven. The polymerization reaction can, however, also be carried out while the sample is still immersed in the aqueous impregnation medium. The advantage of such application is that the cellulose is in a swollen state during the cross-linking treatment and the cross-links formed stabilize the more open structure of the cellulose as it exists in the swollen state. As a result, the moisture adsorbing ability of the cellulose is enhanced and the wet crease-recovery is increased to a greater extent than the dry crease-recovery.

The same pattern of results is obtained if a dry-state acid-catalyzed cure (etherification) is followed by a wet-stage polymerization and if a wet-stage polymerization is followed by a dry-state acid-catalyzed cure. These processes are illustrated in Examples 6 and 7 hereinafter.

The main advantages of the one-step process (simultaneous vinyl polymerization and etherification) are the following:

(a) For conventional finishes the solution of the reagent and an acid catalyst is padded on the fabric and subsequently cured. The same basic procedure can be applied in this process, the only difference being that a combination of acid and free-radical catalyst has to be used.

(b) Because the cross-linking agent is present in the fabric in the form of a linear addition polymer having a long-chain backbone, the finished fabric is much more stable to hydrolytic attack and chlorine damage than conventional nitrogenous finishes.

(c) The single-step procedure results in retention in the final fabric of a much greater proportion of the original N-methylol-acrylamide applied. In many cases twice as much or more of this agent is retained when the single-step procedure is used as in the two-step procedure. Apparently, the second impregnation removes a portion of the material applied in the first stage of the treatment. Hence, the single step treatment is more efficient and less expensive for a given crease-proofing effect.

Instead of N-methylol-acrylamide, N-methylol derivatives of the amides of methacrylic acid, fumaric acid, maleic acid, itaconic acid, or of the dimer of methacrylic acid, may be employed. Also useful are: N-methyl-N-methylol-acrylamide, the corresponding N-methyl-N-methylol derivatives of the amides of the acids just mentioned, and the methylated derivatives of any of the methylol derivatives mentioned in this paragraph, such as N-methoxymethyl-acrylamide and N-methoxymethyl-methacrylamide. These compounds may be represented by the general formula:

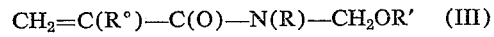

$$CH_2=C(R°)-C(O)-N(R)-CH_2OR' \quad (III)$$

where R, R°, and R' are individually selected from the group consisting of hydrogen and methyl.

Essentially the product of the present invention is a textile material formed of cellulosic fibers cross-linked by an acrylic addition polymer, the cellulose and the polymer of the cross-linked product being joined by a plurality of linkages of the formula

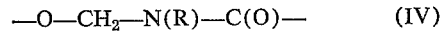

$$-O-CH_2-N(R)-C(O)- \quad (IV)$$

in which the carbon atom of the carbonyl group is attached directly to the carbon atom backbone or main chain of the acrylic polymer and the ether oxygen atom is connected directly to the cellulose residue. R may be hydrogen or a methyl group.

In the following examples, which are illustrative of the present invention, the parts and percentages are by weight unless otherwise indicated. The tests whose results are given in the examples are performed on the treated fabric after being conditioned at 70° F. and 65% relative humidity. The tensile strength is given in pounds per inch width. The crease-recovery angle is the angle obtained by the standard method of testing therefor. In all cases, unless otherwise indicated, the values given for the test are for the warp direction.

EXAMPLE 1

Cotton printcloth fabrics (80 x 80) weighing 4 oz./sq. yd. were padded with an aqueous solution containing 1% N-methylol-acrylamide (NMAAm) and different amounts of the hydrochloride of 2-amino-2-methyl-propanol-1. The impregnated fabrics were squeezed between rollers to provide a predetermined pick-up between 90 and 105% so that the increase in weight of the fabric measured after completion of the curing was as indicated in column 2 of Table I. After squeezing, the impregnated fabrics were supported on a frame and cured in a well-ventilated oven at 300° F. for 3½ minutes. The cured fabric was then washed in hot water containing 0.2% sodium nitrite and rinsed in cold water. The washed fabrics were then hung on a line to dry. The fabrics thus obtained were tested for crease-recovery angle and thereafter, the fabrics were padded through a 0.5% solution of ammonium persulfate in water, cured at 300° F. for 3½ minutes, washed and then dried in air. The crease-recovery was then determined on the dried fabric. The results are summarized in Table I.

*Table I*

| NMAAm Solution (percent) | Increase in Weight of Fabric (percent) | After 1st-step reaction, Crease-Recovery (degrees) | | After 2nd-step reaction, Crease-Recovery (degrees) | |
|---|---|---|---|---|---|
| | | Dry | Wet | Dry | Wet |
| 42.5 | 13.2 | 70 | 60 | 134 | 109 |
| 36.0 | 12.9 | 83 | 70 | 122 | 115 |
| 29.5 | 11.0 | 84 | 70 | 130 | 114 |
| 22.9 | 8.7 | 78 | 76 | 114 | 111 |
| 16.6 | 6.6 | 86 | 68 | 122 | 102 |
| 9.8 | 4.0 | 86 | 68 | 115 | 93 |
| Control | | 70 | 56 | | |

EXAMPLE 2

An 80 x 80 cotton fabric was padded through an aqueous solution containing 0.1% ammonium chloride and 13% NMAAm. The fabric was cured and washed as in Example 1, had a weight increase of 9.6%, a dry crease-recovery of 98° and wet crease-recovery of 81°. After-treatment with an aqueous 0.5% ammonium persulfate solution as in Example 1 increased the crease-recovery angles to 132° and 105°, respectively.

By adding 5% or 10% acrylamide to the second impregnating solution containing 0.5% ammonium persulfate, 4% or 8% additional polymer was insolubilized within and on the fabric. The dry and wet crease-recoveries were 140° and 100° for 5% acrylamide or 133° and 89° for 10% acrylamide.

EXAMPLE 3

A solution made up of 12% NMAAm, 0.7% azodiisobutyronitrile, 15% acetone, and 72.3% water was applied on an 80 x 80 cotton fabric. After padding, curing and washing as in Example 1, the weight increase was 7% and the dry crease-recovery angle was 82°. The sample was then after-treated with a 1% solution of the hydrochloride of 2-amino-2-methyl-propanol-1 and cured. Its crease-recovery increased to 115°.

A similar improvement in crease-recovery was obtained when the N-methylol-acrylamide was replaced by a corresponding amount of N-methylol-methacrylamide.

EXAMPLE 4

(a) Cotton fabrics (80 x 80) were padded with solutions containing 0.5% ammonium persulfate and different amounts of NMAAm, framed, cured at 300° F. for 3½ minutes, washed and line-dried as in Example 1. The results are presented in Table II.

*Table II*

| NMAAm in Solution (percent) | Weight Increase of Fabric (percent) | Crease-Recovery (degrees) | | Tensile Strength, lbs./inch |
|---|---|---|---|---|
| | | Dry | Wet | |
| 20 | 15.6 | 135 | 106 | 29.0 |
| 15 | 11.0 | 128 | 109 | 27.8 |
| 12 | 8.6 | 126 | 115 | 29.0 |
| 10 | 6.8 | 116 | 100 | 29.4 |
| 8 | 5.6 | 113 | 101 | 26.4 |
| Control | | 75 | 55 | 25.4 |

The fabric with 8.6% weight increase was tested for chlorine damage, which was found to be only 20%. Neither the extent of chlorine damage nor the crease-recovery angle changed after five severe alkaline washes.

All fabrics with a dry crease-recovery higher than 120° dried flat without wrinkles if line-dried or tumble-dried.

(b) Similar results were obtained when the NMAAm was replaced by a corresponding amount of N-methoxy-methyl-acrylamide in one case and by N-methyl-N-methylol-acrylamide in another.

EXAMPLE 5

(a) The same procedure was followed as in Example 4, except that the ammonium persulfate was replaced by an aqueous solution of 1% of the hydrochloride of 2-amino-2-methyl-propanol-1 and 3% of hydrogen peroxide. The results are shown in Table III.

*Table III*

| NMAAm in Solution (percent) | Weight Increase of Fabric (percent) | Crease-Recovery (degrees) | | Tensile Strength, lbs./inch |
|---|---|---|---|---|
| | | Dry | Wet | |
| 20 | 14.7 | 125 | 111 | 28.6 |
| 15 | 10.4 | 117 | 108 | 28.8 |
| 12 | 7.3 | 103 | 95 | 31.4 |
| 10 | 5.6 | 113 | 100 | 30.4 |

(b) A viscose rayon was treated in the same way as the cotton fabric of part (a). The crease-resistance was similarly improved.

EXAMPLE 6

A solution containing 20% NMAAm and 0.05% ammonium chloride was applied to an 80 x 80 cotton fabric for the first-stage cure. The weight increase was 11.3%. A piece of the resulting fabric was designated A. Another piece designated B was after-treated with an aqueous 0.5% ammonium persulfate solution, and, to effect addition polymerization in "dry state," it was cured at 300° F. for 3½ minutes, washed and dried in air as in Example 1. A third piece designated C was immersed for two hours in an aqueous 1% ammonium persulfate solution at 50° C. under a nitrogen atmosphere to polymerize the monomer in wet state. Table IX summarizes the results.

*Table IV*

| | Control | A | B | C |
|---|---|---|---|---|
| Percent Moisture Regain | 6.7 | 5.6 | 6.1 | 8.1 |
| Crease-Recovery (degrees): | | | | |
| Dry | 75 | 102 | 132 | 111 |
| Wet | 55 | 82 | 109 | 120 |

EXAMPLE 7

(a) A cotton fabric was immersed for two hours in an aqueous 15% NMAAm solution containing 0.2% ammonium persulfate at 50° C. and under nitrogen atmosphere. After washing, the weight increase was 7% and the dry and wet crease-recoveries were 48° and 131°, respectively. The same fabric was then padded with a 0.2% ammonium chloride solution and then heated in an oven at 300° F. for 3½ minutes to effect curing in "dry state." The fabric was then washed and air-dried. The dry crease-recovery increased to 99° while the wet crease-recovery decreased to 126°.

(b) A rayon fabric was treated as in part (a), except that the NMAAm was replaced by a corresponding amount of N-methyl-N-methoxymethyl-methacrylamide. The crease-resistance was markedly improved thereby.

It is to be understood that changes and variations may be made without departing from the spirit and scope of the invention as defined in the appended claims.

I claim:
1. A process of treating textile material of cellulose fibers which comprises impregnating the material with an aqueous solution containing dissolved therein at least 5% by weight of a compound of the formula

$$CH_2=C(R°)—C(O)—N(R)—CH_2OR'$$

wherein R, R°, and R' are individually selected from the group consisting of hydrogen and methyl, and water-soluble acidic catalytic material selected from the group consisting of
(1) a water-soluble free-radical polymerization initiator of acidic character at a concentration of at least 0.1% by weight and
(2) a mixture of a water-soluble free-radical polymerization initiator selected from the group consisting of neutral and acidic initiators at a concentration of at least 0.1% by weight and a water-soluble acidic catalyst, other than a free-radical polymerization initiator, for the etherification reaction of —CH$_2$OR′ groups of the aforesaid compound with hydroxyl groups of the cellulose at a concentration of at least about 0.05% by weight, and drying and heating the impregnated material at a temperature of about 105° to 205° C. until cross-linking of the cellulose is obtained.

2. A process of treating textile material of cellulose fibers which comprises impregnating the material with an aqueous solution containing dissolved therein at least 5% by weight of a compound of the formula $$CH_2=C(R°)—C(O)—N(R)—CH_2OR'$$

wherein R, R°, and R′ are individually selected from the group consisting of hydrogen and methyl, and a neutral water-soluble free radical polymerization initiator at a concentration of at least 0.1% by weight, addition polymerizing the compound in situ to produce a polymer containing a plurality of —CH$_2$OR′ groups available for reaction with the hydroxyl groups of the cellulose, then impregnating the material with an aqueous solution of a water-soluble acidic catalyst for the etherification reaction of —CH$_2$OR′ groups of the aforesaid compound with hydroxyl groups of the cellulose at a concentration of at least about 0.05% by weight, and drying and curing at 105° to 205° C. to react —CH$_2$OR′ groups with hydroxyl groups of the cellulose and thereby cross-link the latter.

3. A process of treating a textile material of cellulose fibers which comprises incorporating into the material a substance consisting essentially of addition-polymerizable monoethylenically unsaturated molecules, said molecules comprising at least 5% by weight, based on the weight of the material, of at least one compound of the formula $$CH_2=C(R°)—C(O)—N(R)—CH_2OR'$$

wherein R, R°, and R′ are individually selected from the group consisting of hydrogen and methyl, and water-soluble acidic catalytic material selected from the group consisting of
(1) a water-soluble free-radical polymerization initiator of acidic character, the incorporation of the substance and the initiator being effected by impregnation with an aqueous solution containing at least 5% by weight of the substance and at least 0.1% by weight of the initiator, and
(2) both (a) a water-soluble free-radical polymerization initiator selected from the group consisting of neutral and acidic initiators and (b) a water-soluble catalyst, other than a free-radical polymerization initiator, for the etherification reaction of —CH$_2$OR′ groups of the aforesaid compound with hydroxyl groups of the cellulose, the incorporation of the substance and (a) and (b) being effected by impregnation with an aqueous solution containing at least 5% by weight of the substance, at least 0.1% by weight of the initiator (a) and at least about 0.05% by weight of the catalyst (b), and thereafter drying the material and heating the material at 105° to 205° C. until cross-linking of the cellulose is obtained.

4. As an article of manufacture, a textile material which is the product of the process of claim 3.

5. A process of treating a textile material of cellulose fibers which comprises incorporating into the material a substance consisting essentially of addition-polymerizable monoethylenically unsaturated molecules, said molecules comprising at least 5% by weight, based on the weight of the material, of at least one compound of the formula $$CH_2=C(R°)—C(O)—N(R)—CH_2OR'$$

wherein R, R°, and R′ are individually selected from the group consisting of hydrogen and methyl, and a water-soluble acidic catalyst, other than a free-radical polymerization initiator, for the etherification reaction of —CH$_2$OR′ groups of the aforesaid compound with hydroxyl groups of the cellulose, the incorporation of the substance and the catalyst being effected by impregnation with an aqueous solution containing at least 5% by weight of the substance and at least about 0.05% by weight of the catalyst, thereafter drying and heating the material at 105° to 205° C. to effect etherification of the cellulose with the compound of the aforesaid formula, then impregnating the material with an aqueous solution containing at least 0.1% by weight of a free radical initiator selected from the group consisting of neutral and acidic initiator, and then drying and curing the material at a temperature of 105° to 205° C. until cross-linking of the cellulose is obtained.

6. A process of treating a textile material of cellulose fibers which comprises incorporating into the material a substance consisting essentially of addition-polymerizable monoethylenically unsaturated molecules, said molecules comprising at least 5% by weight, based on the weight of the material, of at least one compound of the formula $$CH_2=C(R°)—C(O)—N(R)—CH_2OR'$$

wherein R, R°, and R′ are individually selected from the group consisting of hydrogen and methyl, and a water-soluble acidic catalyst, other than a free-radical polymerization initiator, for the etherification reaction of —CH$_2$OR′ groups of the aforesaid compound with hydroxyl groups of the cellulose, the incorporation of the substance and the catalyst being effected by impregnation with an aqueous solution containing at least 5% by weight of the substance and at least about 0.05% by weight of the catalyst, thereafter drying and heating the material at 105° to 205° C. to effect etherification of the cellulose with the compound of the aforesaid formula, then maintaining the material in an aqueous solution having a temperature of 25 to 100° C. and at least 0.1% by weight of a free radical initiator selected from the group consisting of neutral and acidic initiators to effect addition polymerization of ether-linked compound of the formula above until cross-linking of the cellulose is obtained.

7. A process of treating textile material of cellulose fibers which comprises immersing the material in an aqueous solution at 25° to 100° C. containing dissolved therein at least 5% by weight of a compound of the formula $$CH_2=C(R°)—C(O)—N(R)—CH_2OR'$$

wherein R, R°, and R′ are individually selected from the group consisting of hydrogen and methyl, and at least 0.1% by weight of a neutral water-soluble free-radical polymerization initiator to effect addition polymerization of the compound in situ to produce a polymer containing a plurality of —CH$_2$OR′ groups available for reaction with the hydroxyl groups of the cellulose, then impregnating the material with an aqueous solution of a water-soluble acidic catalyst, other than free-radical polymerization initiator, for the etherification reaction of —CH$_2$OR′ groups of the aforesaid compound with hydroxyl groups of the cellulose at a concentration of at least about 0.05% by weight, and drying and curing at 105° to 205° C. to react —CH$_2$OR′ groups with hydroxyl groups of the cellulose and thereby cross-link the latter.

8. As an article of manufacture, a textile material which is the product of the process of claim 7.

9. A process of treating textile material of cellulose fibers which comprises impregnating the material with an aqueous solution containing at least 5% by weight of N-methylolacrylamide, and at least 0.1% by weight of a neutral free-radical initiator, addition polymerizing the N-methylolacrylamide in situ to produce a polymer containing a plurality of methylol groups available for reaciton with the hydroxyl groups of the cellulose, then impregnating the material with an aqueous solution containing at least about 0.05% by weight of a water-soluble catalyst, other than a free-radical polymerization initiator, for the etherification reaction of methylol groups with the hydroxyl groups of the cellulose, and drying and curing at 105° to 205° C. to react methylol groups with hydroxyl groups of the cellulose and thereby cross-link the latter.

10. As an article of manufacture, a textile material which is the product of the process of claim 9.

11. A process of treating textile material of cellulose fibers which comprises impregnating the material with an aqueous solution containing at least 5% by weight of N-methylolmethacrylamide and at least 0.1% by weight of a neutral free-radical initiator, addition polymerizing the N-methylolmethacrylamide in situ to produce a polymer containing a plurality of methylol groups available for reaction with the hydroxyl groups of the cellulose, then impregnating the material with an aqueous solution containing at least about 0.05% by weight of a water-soluble catalyst, other than a free-radical polymerization initiator, for the etherification reaction of methylol groups with the hydroxyl groups of the cellulose, and drying and curing at 105° to 205° C. to react methylol groups with hydroxyl groups of the cellulose and thereby cross-link the latter.

12. As an article of manufacture, a textile material which is the product of the process of claim 11.

13. A process of treating textile material of cellulose fibers which comprises impregnating the material with an aqueous solution containing at least 5% by weight of N-methoxymethylacrylamide and at least 0.1% by weight of a neutral free-radical initiator, addition polymerizing the N-methoxymethylacrylamide in situ to produce a polymer containing a plurality of methylated methylol groups available for reaction with the hydroxyl groups of the cellulose, then impregnating the material with an aqueous solution containing at least about 0.05% by weight of a water-soluble catalyst, other than a free-radical polymerization initiator, for the etherification reaction of methylol groups with the hydroxyl groups of the cellulose, and drying and curing at 105° to 205° C. to react methylol groups with hydroxyl groups of the cellulose and thereby cross-link the latter.

14. A process of treating textile material of cellulose fibers which comprises impregnating the material with an aqueous solution containing at least 5% by weight of N-methylolacrylamide, and at least 0.1% by weight of a free-radical initiator selected from the group consisting of alkali metal and ammonium persulfates, addition polymerizing the N-methylolacrylamide in situ at 25° to 100° C. to produce a polymer containing a plurality of methylol groups available for reaction with the hydroxyl groups of the cellulose, and drying and curing at 105° to 205° C. to react methylol groups with hydroxyl groups of the cellulose and thereby cross-link the latter.

References Cited in the file of this patent
UNITED STATES PATENTS

| | | |
|---|---|---|
| 2,173,005 | Strain | Sept. 12, 1939 |
| 2,216,095 | Britton | Sept. 24, 1940 |
| 2,264,229 | Wallach | Nov. 25, 1941 |
| 2,455,083 | Musser | Nov. 30, 1948 |
| 2,789,030 | Fetscher | Apr. 16, 1957 |
| 2,796,656 | Schappel | June 25, 1957 |
| 2,837,511 | Mantell | June 3, 1958 |
| 2,837,512 | Mantell | June 3, 1958 |
| 2,922,768 | Mino | Jan. 26, 1960 |